United States Patent
Mathon et al.

(10) Patent No.: US 10,737,407 B2
(45) Date of Patent: Aug. 11, 2020

(54) MOLD FOR FABRICATING A TURBINE FAN CASING OUT OF COMPOSITE MATERIAL, AND A METHOD OF CLOSING SUCH A MOLD

(71) Applicant: SAFRAN AIRCRAFT ENGINES, Paris (FR)

(72) Inventors: Richard Mathon, Moissy-Cramayel (FR); Raoul Jaussaud, Moissy-Cramayel (FR); Dominique Michel Serge Magnaudeix, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 261 days.

(21) Appl. No.: 15/777,713

(22) PCT Filed: Nov. 17, 2016

(86) PCT No.: PCT/FR2016/052987
§ 371 (c)(1),
(2) Date: May 21, 2018

(87) PCT Pub. No.: WO2017/089680
PCT Pub. Date: Jun. 1, 2017

(65) Prior Publication Data
US 2018/0370082 A1 Dec. 27, 2018

(30) Foreign Application Priority Data
Nov. 26, 2015 (FR) ...................................... 15 61396

(51) Int. Cl.
*B29C 33/48* (2006.01)
*B29C 33/30* (2006.01)
(Continued)

(52) U.S. Cl.
CPC .......... *B29C 33/485* (2013.01); *B29C 33/301* (2013.01); *B29C 33/307* (2013.01); *B29C 70/48* (2013.01); *B29L 2031/7504* (2013.01)

(58) Field of Classification Search
CPC .... B29C 33/485; B29C 53/824; B29C 70/446
See application file for complete search history.

(56) References Cited

U.S. PATENT DOCUMENTS 4,288,277 A * 9/1981 Siilats ................... B29C 53/824
156/425
8,025,499 B2 * 9/2011 Hubert .................... B29C 33/48
249/184
(Continued)

FOREIGN PATENT DOCUMENTS

FR       2 957 093 A1    9/2011
FR       3002750 A1 *    9/2014    ........... B29C 70/462
WO    WO 2014/131992 A1    9/2014

OTHER PUBLICATIONS

International Search Report dated Feb. 13, 2017 in PCT/FR2016/052987 filed Nov. 17, 2016.

*Primary Examiner* — Cachet I Proctor
(74) *Attorney, Agent, or Firm* — Oblon, McClelland, Maier & Neustadt, L.L.P.

(57) ABSTRACT

A mold for use in fabricating a gas turbine fan casing out of composite material includes a mandrel for having wound thereon a fiber preform of a fan casing and an annular wall with an outside surface of profile corresponding to the profile of the inside surface of the casing that is to be fabricated and of two lateral rims of profiles corresponding to the profiles of outer flanges of the casing that is to be fabricated; a plurality of mold cover angular sectors that are assembled in leaktight manner on the mandrel and that are to close the mold and to compact the fiber preform wound on the mandrel; and a plurality of locking keys configured to
(Continued)

lock together in leaktight manner neighboring mold cover sectors. A method of closing such a mold, and a method of fabricating a fan casing are included.

11 Claims, 4 Drawing Sheets

(51) Int. Cl.
  *B29C 70/48* (2006.01)
  *B29L 31/00* (2006.01)

(56) References Cited

U.S. PATENT DOCUMENTS

| | | | |
|---|---|---|---|
| 2006/0134251 A1* | 6/2006 | Blanton | B29C 33/48 425/110 |
| 2006/0225265 A1* | 10/2006 | Burnett | B21D 53/92 29/448 |
| 2007/0062022 A1* | 3/2007 | Douglas | B29C 33/485 29/527.1 |
| 2010/0024971 A1* | 2/2010 | Benson | B29D 99/0003 156/245 |
| 2013/0108417 A1 | 5/2013 | Renon | |
| 2014/0110063 A1* | 4/2014 | Mathon | B29C 70/32 156/446 |
| 2014/0302186 A1* | 10/2014 | Mathon | B29C 70/32 425/112 |
| 2015/0239181 A1* | 8/2015 | Corradini | B65H 23/0328 156/64 |
| 2016/0009003 A1 | 1/2016 | Chauvin | |
| 2017/0297241 A1* | 10/2017 | Magnaudeix | B29C 70/48 |

\* cited by examiner

MOLD FOR FABRICATING A TURBINE FAN CASING OUT OF COMPOSITE MATERIAL, AND A METHOD OF CLOSING SUCH A MOLD

BACKGROUND OF THE INVENTION

The present invention relates to the general field of fabricating gas turbine casings, and more particularly retention casings for a gas turbine fan of an aeroengine.

In a gas turbine aeroengine, the fan casing performs several functions. It defines the air inlet passage into the engine, it supports an abradable material facing the tips of the fan blades, it optionally supports a structure for absorbing soundwaves in order to provide acoustic treatment at the inlet of the engine, and it incorporates or supports a retention shield. Such a shield constitutes a trap for retaining debris, such as articles that have been ingested or fragments of damaged blades that are projected outwards by centrifuging, so as to prevent them passing through the casing and reaching other portions of the aircraft.

Proposals have already been made to make a fan casing out of composite material. By way of example, reference may be made to Document EP 1 961 923, which describes fabricating a casing out of composite material and of thickness that varies, the method including forming a fiber preform by superposing layers of a fiber texture and then densifying the fiber reinforcement with a matrix. More precisely, that document makes provision to use a take-up mandrel for three-dimensionally weaving the fiber texture, which texture is then wound as superposed layers on an impregnation mandrel that presents an outside surface of profile that corresponds to the profile of the central portion of the casing that is to be fabricated, together with two lateral rims corresponding to fastener flanges of the casing. The fiber preform is held on the impregnation mandrel and it is impregnated with resin before polymerizing the resin.

In order to impregnate the fiber preform by a resin transfer molding (RTM) type injection method, it is known to position the elements of a mold cover on the impregnation mandrel so as to form an injection mold. By way of example, reference may be made to Document WO 2013/060978, which discloses putting angular sectors into place in order to close the resin injection mold on the impregnation mandrel. Nevertheless, closing the mold as described in that document raises several problems. In particular, its angular sectors do not provide uniform compacting of the fiber preform, since the pressure that is applied can vary from one sector to another and it need not be applied solely towards the fiber preform. Furthermore, sealing between two adjacent angular sectors can be unsatisfactory, thereby reducing the reliability of the mold during injection of the resin.

Consequently, there exists a need for an injection mold that does not present sealing problems while injecting resin, and that ensures that the compacting of the fiber preform is uniform.

OBJECT AND SUMMARY OF THE INVENTION

A main object of the present invention is thus to mitigate such drawbacks by proposing a mold for use in fabricating a gas turbine fan casing out of composite material, the mold comprising:

a mandrel for having a fan casing fiber preform wound thereon, the mandrel comprising an annular wall with an outside surface of profile corresponding to the profile of the inside surface of the casing that is to be fabricated and two lateral rims of profiles corresponding to the profiles of outer flanges of the casing that is to be fabricated;

a plurality of mold cover angular sectors that are assembled in leaktight manner on the mandrel and that are to close the mold and to compact the fiber preform wound on the mandrel; and a plurality of locking keys configured to lock together in leaktight manner neighboring mold cover sectors, each locking key being fastened on two neighboring mold cover angular sectors.

The mold of the invention is remarkable in that, by using mold cover angular sectors that are assembled in leaktight manner on the mandrel, it makes it possible to ensure that the fiber preform is compacted radially against the mandrel, while also providing good sealing of the mold once closed. Specifically, the mold cover angular sectors are assembled directly on the mandrel and they are also locked to one another by locking keys. Assembling sectors on the mandrel makes it possible to compact the fiber preform to a determined pressure, while also providing sealing between the sectors of the mandrel. The locking keys serve to assemble the angular sectors to one another in leaktight manner. Thus, the functions of compacting and of providing sealing between the sectors are separated, thereby increasing the overall reliability of the mold.

Preferably, the mold further comprises guide means for guiding each mold cover sector while it is being assembled on the mandrel of the mold. Such guide means may comprise a plurality of fingers extending along radial axes from a lateral rim of the mandrel, each finger co-operating with a notch present in each mold cover sector.

Also preferably, the mold further comprises a plurality of clamping screws extending along radial axes and configured to fasten the mold cover sectors on the mandrel of the mold.

In an embodiment, the mold may have six angular sectors and six locking keys.

The invention also provides a method of closing an injection mold for use in fabricating a gas turbine fan casing out of composite material, the mold comprising a mandrel onto which a fan casing fiber preform is to be wound, the mandrel comprising an annular wall having an outside surface of profile that corresponds to the profile of the inside surface of the casing that is to be fabricated and two lateral rims of profiles that correspond to the profiles of outer flanges of the casing that is to be fabricated, the mold further comprising a plurality of mold cover angular sectors for closing the mold and for compacting the fiber preform wound on the mandrel, the method comprising:

a) assembling the mold cover sectors in leaktight manner on the mandrel of the mold; and b) fastening a locking key on two neighboring mold cover angular sectors so as to lock said neighboring angular sectors together in leaktight manner.

When the mold cover has at least three angular sectors, assembling the third angular sector between the first and second sectors that are already in place can raise problems. Specifically, the first and second angular sectors that are already assembled compact the fiber preform, whereas in the space in which the third sector is to be assembled the fiber preform is not yet compacted. When the third sector is assembled on the mandrel, it is brought up in a radial direction. Consequently, fibers may become pinched at the junction between the first and third sectors and at the junction between the second and third sectors. Such pinching is not desirable since it leads to variations of the fiber content in the fiber preform, in particular by creating wrinkles, and thus leading to defects in the casing as fabricated.

To this end, the mold may comprise at least three mold cover sectors, with step a) then comprising:

assembling first and second mold cover sectors in leaktight manner on the mandrel of the mold while leaving between them a space that is to receive a third mold cover sector; and temporarily fastening at least one compacting spacer on the mandrel in said space that is to receive the third mold cover sector, the compacting spacer being positioned against a longitudinal face of the first or the second mold cover sector and being designed to compact a portion of the preform.

Such a compacting spacer compacts a portion of the fiber preform situated in the space that is to receive the third angular sector in the vicinity of the ends of the first and second angular sectors. The transitions between the zones compacted by the first and second angular sectors and the non-compacted zone, are thereby shifted to where the third angular sector is to be positioned, and they are no longer located at the interface between two angular sectors. Thus, pinching of the fiber preform is avoided while the third sector is being assembled.

Advantageously, the compacting spacer has a face that is designed to compact the preform, that face presenting a profile that is configured to create a compacting transition zone between a portion of the preform that is compacted by a mold cover sector and a non-compacted portion of the preform.

In an implementation, the face of the compacting spacer that is to compact the preform has a profile that is rounded at its end remote from the longitudinal face of the mold cover sector against which the compacting spacer is positioned. Such a rounded profile makes it possible to avoid shearing the preform when it is compacted by the compacting spacer.

The invention also provides a method of fabricating a gas turbine fan casing out of composite material, the method comprising: winding a fiber preform on the mandrel of a mold as described above; closing the mold by a method as described above: injecting a resin into the mold; and unmolding the fan casing.

Finally, the invention provides a gas turbine including a fan casing fabricated by such a method.

BRIEF DESCRIPTION OF THE DRAWINGS

Other characteristics and advantages of the present invention appear from the following description given with reference to the accompanying drawings, which show an embodiment having no limiting character. In the figures.

DETAILED DESCRIPTION OF THE INVENTION

The invention is described below in the context of its application to fabricating a gas turbine aeroengine fan casing.

Figure 1:
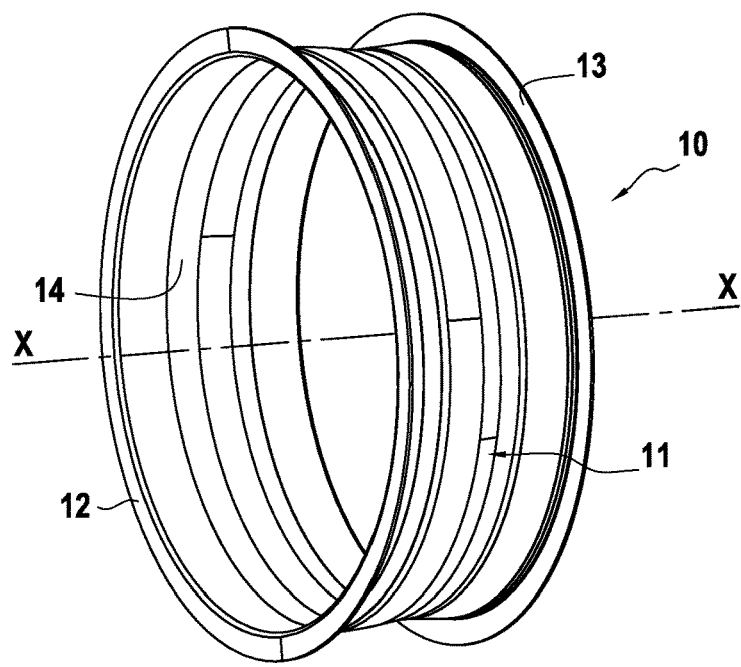
FIG. 1 is a diagrammatic view of a gas turbine fan casing.

FIG. 1 is a perspective view of a fan casing 10 that can be fabricated by using a mold and a method of the invention. Such a casing is centered on a longitudinal axis X-X and has an annular wall 11 defined upstream by an upstream flange 12 and downstream by a downstream flange 3 (where upstream and downstream are defined relative to the flow direction of the gas stream through the gas turbine). The inside surface 14 of the annular wall 11 is for defining an air inlet passage into the gas turbine.

Figure 2:
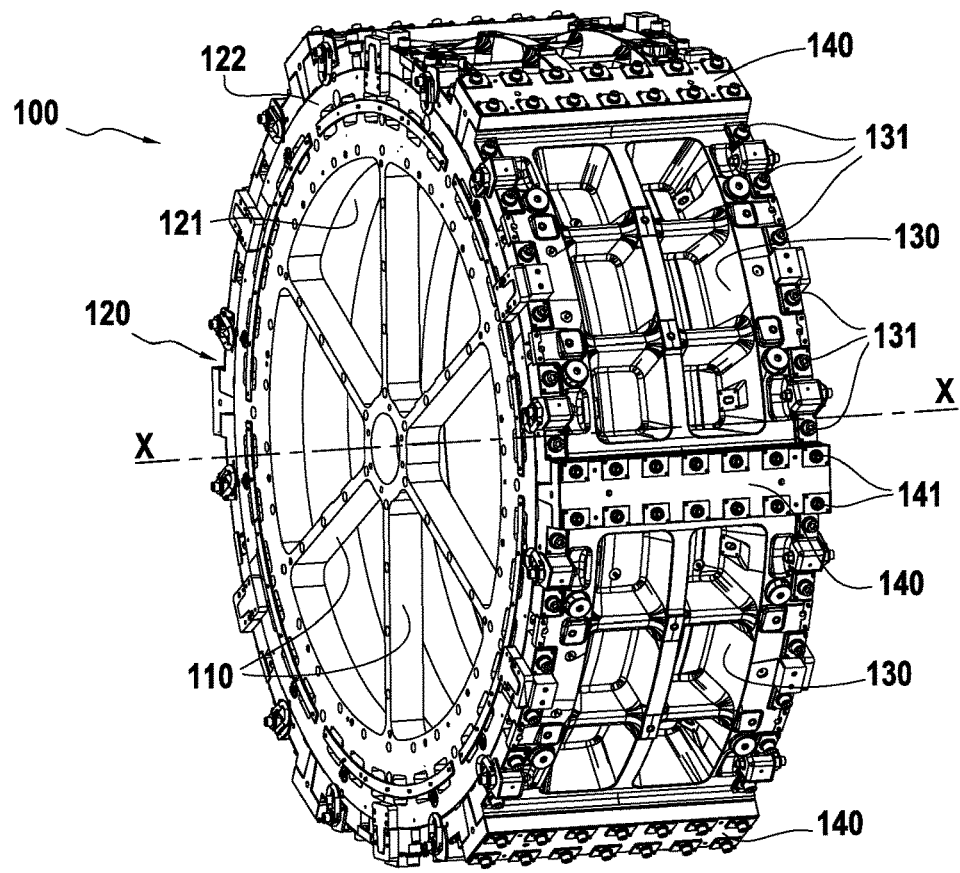
FIG. 2 is a perspective view of a mold of the invention when it is closed.

FIG. 2 is a diagrammatic perspective view of a mold of the invention when it is closed.

Such a mold may be used for impregnating a fiber preform by a resin transfer molding (RTM) type method in order to fabricate a fan casing 10 such as that described above. The fiber preform may be made by three-dimensionally weaving fibers, e.g. carbon, glass, aramid, or ceramic fibers, and the impregnation matrix may be made of polymer, e.g. epoxy, bismaleimide, or polyimide.

The mold 100 is rotatably mounted on a drive shaft (not shown) centered on the axis X-X, and it comprises a mandrel 120. Below, "longitudinal", "transverse", and "radial" directions are defined relative to this axis X-X, where a "transverse" plane is a plane perpendicular to the longitudinal axis.

The mandrel 120 has an annular wall 121 in the form of a drum onto which a fiber preform 200 (FIG. 5) is to be wound, and it also has two lateral rims 122. The mandrel 120 is held on its drive axis by six spokes 110.

The rims 122 form bearing surfaces that are to receive folded-out portions of the preform 200 being wound on the mandrel 120, which portions are to form the upstream and downstream flanges 12 and 13 of the fan casing 10.

In accordance with the invention, the mold 100 also has a mold cover made up of a plurality of angular sectors 130 (there being six mold cover angular sectors in this example) that are assembled in leaktight manner on the mandrel 120, and that are locked together in leaktight manner by a corresponding number of locking keys 140.

The sectors 130 are assembled on the lateral rims 122 by clamping screws 131 that extend along axes that are radial. The sectors 130 are mechanically fastened directly on the mandrel 120. These screws 131 enable the sectors 130 to be assembled on the rims 122, and they enable the compacting pressure that is applied against the fiber preform 200 to be adjusted. O-rings (not shown) are positioned on the rims 122 to provide sealing between the sectors 130 and the mandrel 120.

Furthermore, the sectors 130 are locked to one another by locking keys 140. A key 140 is fastened between two adjacent sectors 130 by two rows of screws 141 extending longitudinally over the ends of each of the sectors 130. The locking keys 140 are assembled radially from the outside, once the sectors 130 have been assembled on the mandrel 120. In the example shown, each locking key 140 is fastened directly on two neighboring sectors 130.

As a result, the keys provide mutual circumferential clamping of the sectors 130 together with sealing between those sectors by using flat gaskets (not shown) that are positioned between the sectors 130. It should be observed that the keys 140 play no role in assembling the sectors 130 on the mandrel 120.

The fabrication of a fan casing 10 is described below with reference to FIGS. 3 to 6B.

A fiber preform 200 (FIG. 3) needs initially to be wound onto the mandrel 120. Methods have already been proposed for winding a fiber preform, e.g. made by three-dimensional weaving, around a mandrel of the kind used in the invention, and they are not described in greater detail. By way of example, reference may be made to Document WO 2012/140355, which proposes a machine for winding a fiber texture onto an impregnation mandrel.

Once the preform 200 has been wound onto the mandrel, the sectors 130 need to be assembled on the mandrel 120.

Figure 4:
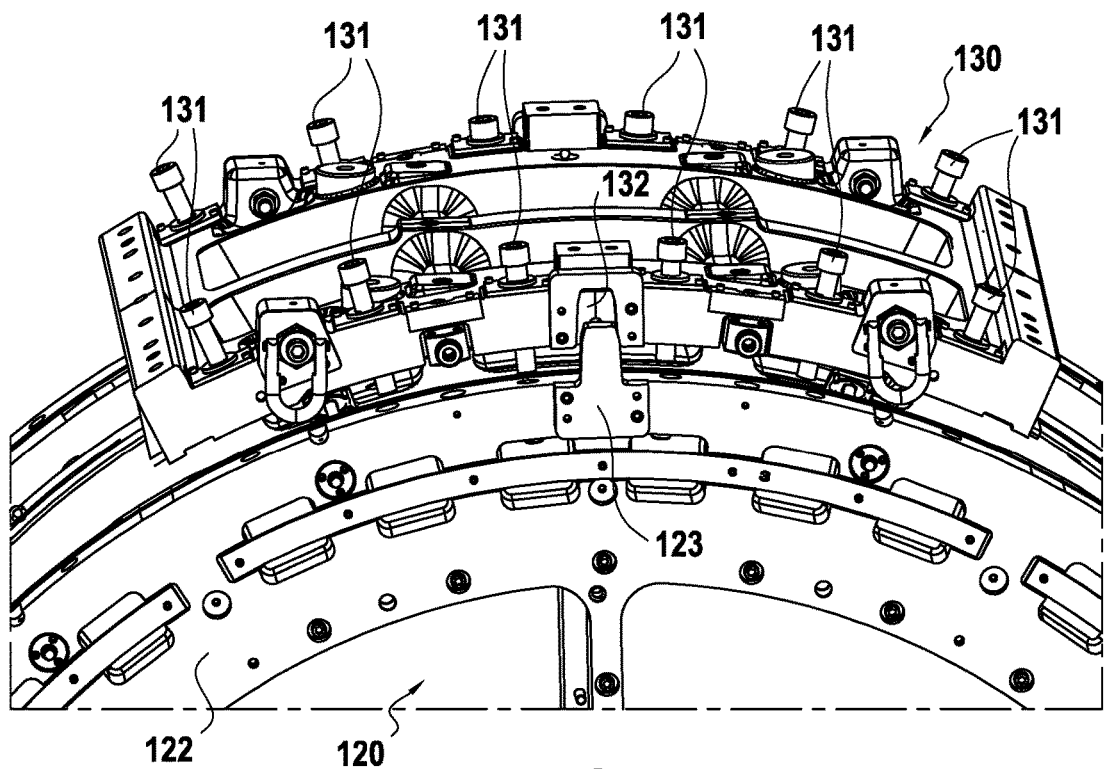
FIG. 4 shows an angular sector of the mold cover being guided on the mandrel.

FIG. 4 shows a step of moving a sector 130 up to the mandrel 120. More particularly, guide means 123, 132 are provided to ensure that the sector 130 approaches the mandrel radially and comes to compact the preform 200 in a radial direction against the mandrel 120. These guide means comprise fingers 123 extending along radial axes provided on each rim 122, these fingers 123 being designed to co-operate with notches 132 of shape complementary to the shape of the fingers 123 and likewise extending along radial axes and located centrally in the upstream and downstream faces of each sector 130. In an embodiment that is not shown, the fingers 123 could be present on the upstream and downstream faces of each sector 130, with the notches 132 being present in the rims 122.

Once the sector 130 has approached the mandrel and been guided up to the mandrel by using the fingers 123 and the notches 132, the clamping screws 131 are positioned to finalize leaktight assembly of the sector 130 on the mandrel. The pressure with which the preform 200 is compacted can be controlled and maintained by the clamping screws 131. The clamping screws 131 are preferably put into place in a particular order, beginning by those closest to the guide fingers 123 and terminating with those situated at the ends of the sector 130.

Figure 3:
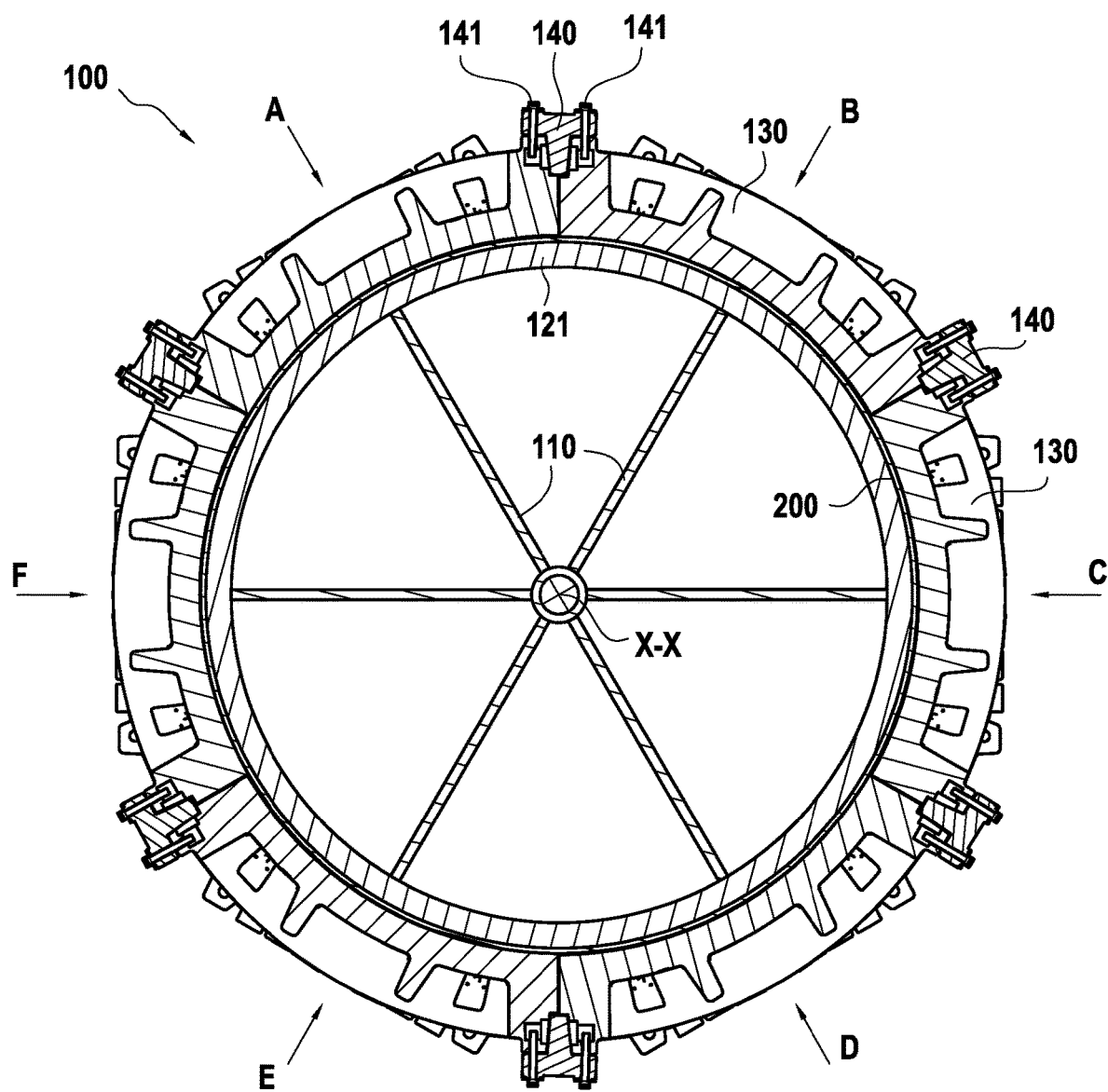
FIG. 3 is a cross-section view of the FIG. 2 mold.

With reference to FIG. 3, the sectors 130 are assembled on the mandrel 120 in a certain order: the sectors referenced A, C, and E are put into position initially, followed by the sectors B, D, and F. The sector A is positioned in the end-of-winding zone of the preform. It is important to mount the sectors in this order in order to avoid forming wrinkles in the fiber preform 200 when the mold is closed.

Figure 5:
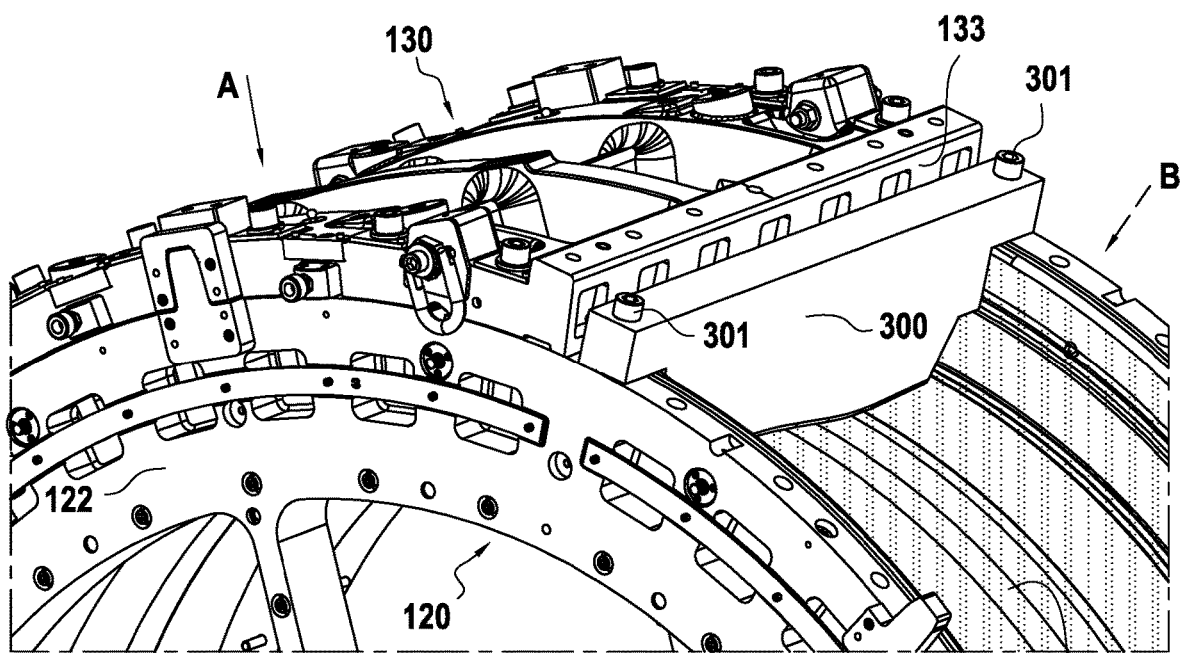
FIG. 5 shows a compacting spacer assembled on the mold mandrel.

In an advantageous provision of the invention, shown in FIG. 5, before putting the last sectors B, D, and F into place, compacting spacers 300 are fastened temporarily on the mandrel 120 in the spaces that are to be occupied by the sectors B, D, and F (only one compacting mandrel 300 is shown in FIG. 5). These spacers serve mainly to ensure that the last three sectors B, D, and F do not pinch the fiber preform at the interfaces between two sectors 130 when they are assembled on the mandrel 120.

By way of example, prior to assembling the sector B, a compacting spacer 300 (FIG. 5) is temporarily positioned against the longitudinal face 133 of the sector A, and another spacer 300 is positioned against the longitudinal face 133 of the sector C (not shown in FIG. 5). The spacers 300 are fastened to the rims 122 of the mandrel 120 by screws 301, and they serve to compact the preform 200 in non-compacted portions thereof.

Figure 6A:
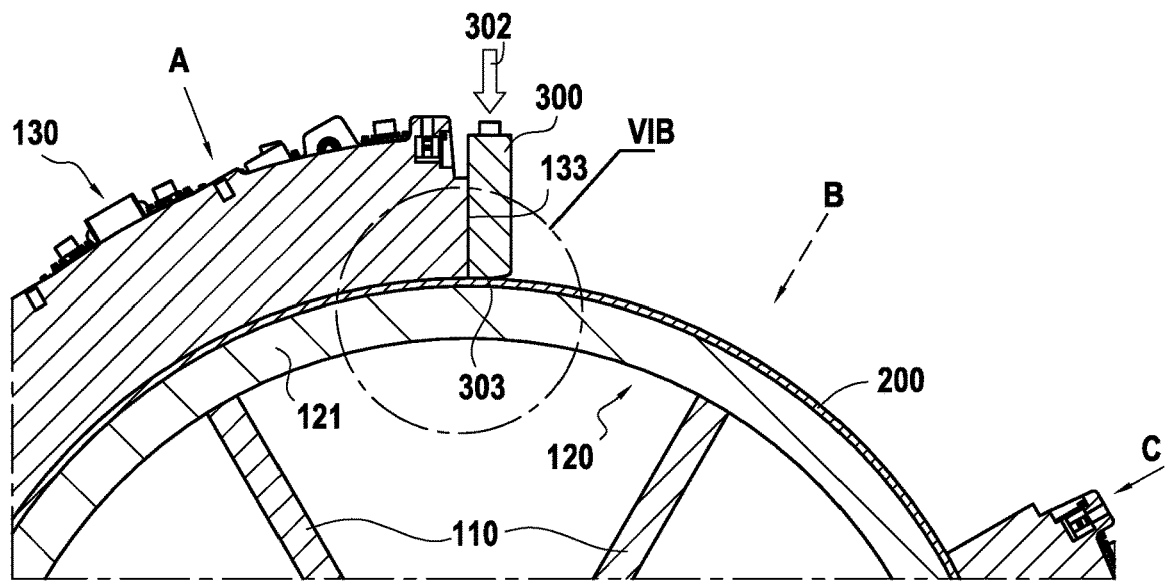
FIGS. 6A and 6B are section views of the FIG. 5 compacting spacer when assembled on the mold mandrel.

As shown in FIG. 6A, which is a cross-section view of FIG. 5, each compacting spacer 300 is taken towards the mandrel 120 by running along the face 133 of the neighboring sector 130 in the direction represented by arrow 302 (unlike the sectors 130, which are brought up to the mandrel 120 in a radial direction). Consequently, pinching of the fiber preform 200 is avoided, and the transition between the zone compacted by the neighboring sector and the non-compacted zone is shifted.

Figure 6B:
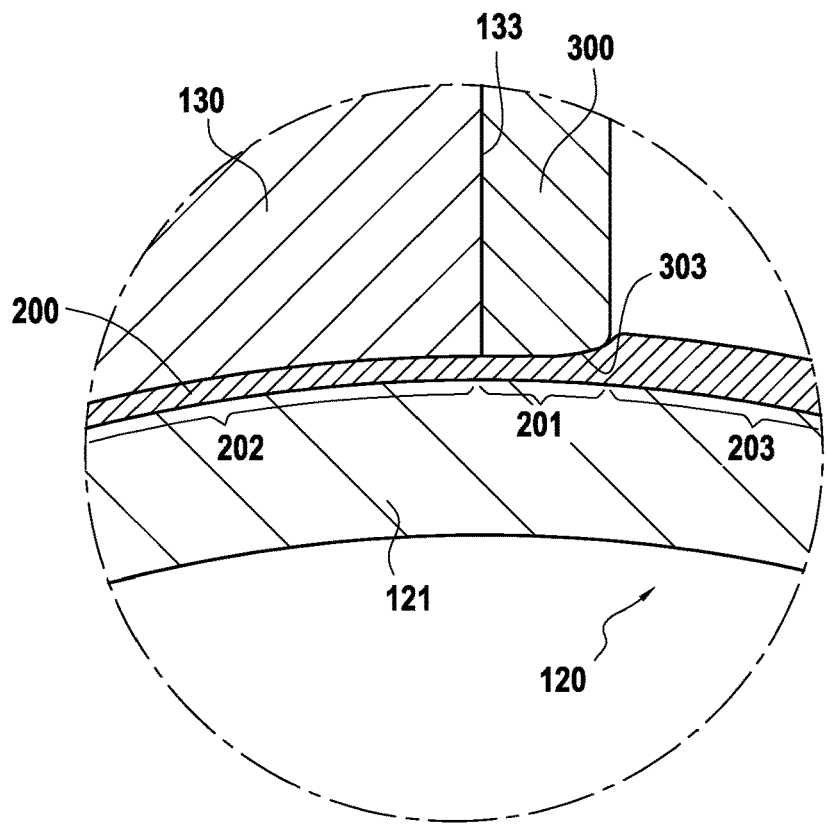

FIG. 6B is an enlarged view of FIG. 6A at the base of the compacting spacer 300.

The compacting spacer 300 has a face 303 that compacts the preform 200 and that presents a profile that is configured to create a compacting transition zone 201 between a portion 202 that has been compacted by a sector 130 (specific in the sector A), and a non-compacted portion 203 of the preform (corresponding to the location for the sector B). Preferably, and in order to create a transition zone 201 that is progressive while avoiding shearing the preform 200 with a sharp edge, the profile is rounded at the end of the spacer remote from the face 133 of the sector 130 against which the spacer 300 is positioned. It can thus be understood that the preform 200 is compacted by the spacers 300 at the interfaces between the sectors A and B, and B and C. The compacting transition zone 201 is compacted by the sector B once it is assembled on the mandrel 120, without causing the preform 200 to be pinched.

The spacers 300 need to be maintained on the mandrel for several minutes, and the last sectors B, D, and F need to be assembled quickly after removing the spacers 300 so that the preform continues to be compacted where the spacers 300 were and any pinching is avoided.

Once all of the sectors 130 have been assembled, the locking keys 140 are put into place between the neighboring sectors 130 in order to finish off closing the mold.

A polymerizable resin is then injected into the mold 100 by means of a pressure difference (by an RTM type method), and the resin is polymerized (e.g. by heating or cooling depending on the nature of the resin used). The fan casing 10 as fabricated in this way can then be unmolded.

The invention claimed is:

1. A mold for use in fabricating a gas turbine fan casing out of composite material, the mold comprising:
   a mandrel for having a fan casing fiber preform wound thereon, the mandrel comprising an annular wall with an outside surface of profile corresponding to the profile of the inside surface of the casing that is to be fabricated and two lateral rims of profiles corresponding to the profiles of outer flanges of the casing that is to be fabricated;
   a plurality of mold cover angular sectors that are assembled in leaktight manner on the mandrel and that are to close the mold and to compact the fiber preform wound on the mandrel; and
   a plurality of locking keys configured to lock together in leaktight manner neighboring mold cover sectors, each locking key being fastened on two neighboring mold cover angular sectors.

2. The mold according to claim 1, further comprising a guiding device for guiding each mold cover sector while it is being assembled on the mandrel of the mold.

3. The mold according to claim 2, wherein the guiding device comprises a plurality of fingers extending along radial axes from a lateral rim of the mandrel, each finger co-operating with a notch present in each mold cover sector, or wherein the guiding device comprises a plurality of fingers extending along radial axes from upstream and downstream faces of a mold cover angular sector, each finger co-operating with a notch present in each lateral rim of the mandrel.

4. The mold according to claim 1, further comprising a plurality of clamping screws extending along radial axes and configured to fasten the mold cover sectors on the mandrel of the mold.

5. The mold according to claim 1, having six angular sectors and six locking keys.

6. The method of fabricating a gas turbine fan casing out of composite material, the method comprising:
   winding a fiber preform on the mandrel of the mold according to claim 1;
   closing the mold;

injecting a resin into the mold; and
unmolding the fan casing.

7. A gas turbine comprising a fan casing fabricated by the method according to claim 6.

8. A method of closing an injection mold for use in fabricating a gas turbine fan casing out of composite material, the mold comprising a mandrel onto which a fan casing fiber preform is to be wound, the mandrel comprising an annular wall having an outside surface of profile that corresponds to the profile of the inside surface of the casing that is to be fabricated and two lateral rims of profiles that correspond to the profiles of outer flanges of the casing that is to be fabricated, the mold further comprising a plurality of mold cover angular sectors for closing the mold and for compacting the fiber preform wound on the mandrel, the method comprising:
   a) assembling the mold cover sectors in leaktight manner on the mandrel of the mold; and
   b) fastening a locking key on two neighboring mold cover angular sectors so as to lock said neighboring angular sectors together in leaktight manner.

9. The method according to claim 8, wherein the mold has at least three mold cover sectors, and step a) comprises:

assembling first and second mold cover sectors in leaktight manner on the mandrel of the mold while leaving between them a space that is to receive a third mold cover sector; and temporarily fastening at least one compacting spacer on the mandrel in said space that is to receive the third mold cover sector, the compacting spacer being positioned against a longitudinal face of the first or the second mold cover sector and being designed to compact a portion of the preform.

10. The method according to claim 9, wherein the compacting spacer has a face that is designed to compact the preform, that face presenting a profile that is configured to create a compacting transition zone between a portion of the preform that is compacted by a mold cover sector and a non-compacted portion of the preform.

11. The method according to claim 10, wherein the face of the compacting spacer that is to compact the preform has a profile that is rounded at its end remote from the longitudinal face of the mold cover sector against which the compacting spacer is positioned.

* * * * *